(12) United States Patent
Al-Ani et al.

(10) Patent No.: US 10,707,716 B2
(45) Date of Patent: Jul. 7, 2020

(54) STATOR CORE AND STATOR SLOT CLOSER

(71) Applicant: BorgWarner Inc., Auburn Hills, MI (US)

(72) Inventors: Mahir Al-Ani, Nottingham (GB); Jeffrey Carter, Mirfield (GB)

(73) Assignee: BorgWarner Inc., Auburn Hills, MI (US)

( * ) Notice: Subject to any disclaimer, the term of this patent is extended or adjusted under 35 U.S.C. 154(b) by 198 days.

(21) Appl. No.: 15/817,693

(22) Filed: Nov. 20, 2017

(65) Prior Publication Data

US 2019/0157933 A1    May 23, 2019

(51) Int. Cl.

| | |
|---|---|
| *H02K 3/487* | (2006.01) |
| *H02K 3/493* | (2006.01) |
| *H02K 9/00* | (2006.01) |
| *H02K 5/20* | (2006.01) |
| *H02K 1/02* | (2006.01) |
| *H02K 1/16* | (2006.01) |
| *H02K 1/20* | (2006.01) |
| *H02K 1/27* | (2006.01) |

(52) U.S. Cl.
CPC .............. *H02K 3/487* (2013.01); *H02K 1/02* (2013.01); *H02K 1/165* (2013.01); *H02K 1/20* (2013.01); *H02K 3/493* (2013.01); *H02K 5/20* (2013.01); *H02K 9/005* (2013.01); *H02K 1/2753* (2013.01)

(58) Field of Classification Search
CPC .......... H02K 3/487; H02K 3/493; H02K 3/48; H02K 3/345; H02K 3/38; H02K 3/30; H02K 3/32; H02K 3/34; H02K 1/185; H02K 1/146; H02K 5/24; H02K 1/02; H02K 1/20; H02K 1/165; H02K 1/2753; H02K 9/005; H02K 5/20
USPC ................... 310/214, 215, 216.113, 216.114
See application file for complete search history.

(56) References Cited

U.S. PATENT DOCUMENTS

| | | | | |
|---|---|---|---|---|
| 3,008,786 | A | * | 11/1961 | Costello ................ H02K 3/527 310/214 |
| 3,869,629 | A | | 3/1975 | Ogawa et al. |
| 3,914,859 | A | | 10/1975 | Pierson |
| 4,466,182 | A | | 8/1984 | Lamatsch et al. |
| 4,562,399 | A | * | 12/1985 | Fisher ................... H02K 29/06 310/111 |

(Continued)

FOREIGN PATENT DOCUMENTS

| | | |
|---|---|---|
| CN | 106059121 A | 10/2016 |
| DE | 2848618 A1 | 5/1980 |

(Continued)

OTHER PUBLICATIONS http://www.nlr.org/news/additive-manufacturing-of-two-metals-in-one-product/ ;Additive Manufacturing of Two Metals in One Product;4 pages.

*Primary Examiner* — Alfonso Perez Borroto
*Assistant Examiner* — Alexander A Singh
(74) *Attorney, Agent, or Firm* — Young Basile Hanlon & MacFarlane, P.C.

(57) ABSTRACT

A product comprising a stator core having a stator base portion and a plurality of stator teeth extending from the stator base portion in a radially inward direction from the stator base portion, wherein adjacent stator teeth define, at least in part, a stator slot therebetween, and a stator slot closer having a portion for closing an associated stator slot.

7 Claims, 3 Drawing Sheets

(56) References Cited

U.S. PATENT DOCUMENTS

| | | | |
|---|---|---|---|
| 4,698,538 A * | 10/1987 | Yoshida | H02K 99/00 |
| | | | 310/156.43 |
| 6,107,718 A | 8/2000 | Schustek et al. | |
| 6,304,018 B1 | 10/2001 | Ham et al. | |
| 6,681,476 B2 | 1/2004 | Mayer et al. | |
| 6,838,790 B2 | 1/2005 | Arimitsu et al. | |
| 6,856,053 B2 | 2/2005 | LeFlem et al. | |
| 8,129,880 B2 | 3/2012 | Rahman et al. | |
| 2002/0047462 A1 * | 4/2002 | Mayer | H02K 1/148 |
| | | | 29/596 |
| 2002/0067092 A1 * | 6/2002 | Crapo | H02K 1/278 |
| | | | 310/156.47 |
| 2007/0269323 A1 | 11/2007 | Zhou et al. | |
| 2013/0069477 A1 * | 3/2013 | Gieras | H02K 3/16 |
| | | | 310/214 |
| 2013/0113311 A1 | 5/2013 | Downing et al. | |
| 2013/0292081 A1 | 11/2013 | Hosek et al. | |
| 2014/0021810 A1 | 1/2014 | Figgins et al. | |
| 2014/0306460 A1 | 1/2014 | Donnelly | |
| 2015/0207386 A1 | 7/2015 | Garrard et al. | |
| 2015/0340913 A1 | 11/2015 | Cho et al. | |
| 2016/0153459 A1 | 6/2016 | Cavagnaro et al. | |
| 2017/0117760 A1 | 4/2017 | Greenlaw et al. | |
| 2017/0179796 A1 | 6/2017 | Isogai | |

FOREIGN PATENT DOCUMENTS

| | | |
|---|---|---|
| EP | 2072824 A2 | 6/2009 |
| EP | 2462350 B1 | 6/2012 |
| EP | 2709241 A2 | 3/2014 |
| WO | 9834325 A1 | 8/1998 |
| WO | 2005025037 A1 | 3/2005 |
| WO | 2008084615 A1 | 7/2008 |
| WO | 2012121643 A1 | 9/2012 |
| WO | 2016091906 A1 | 6/2016 |

\* cited by examiner

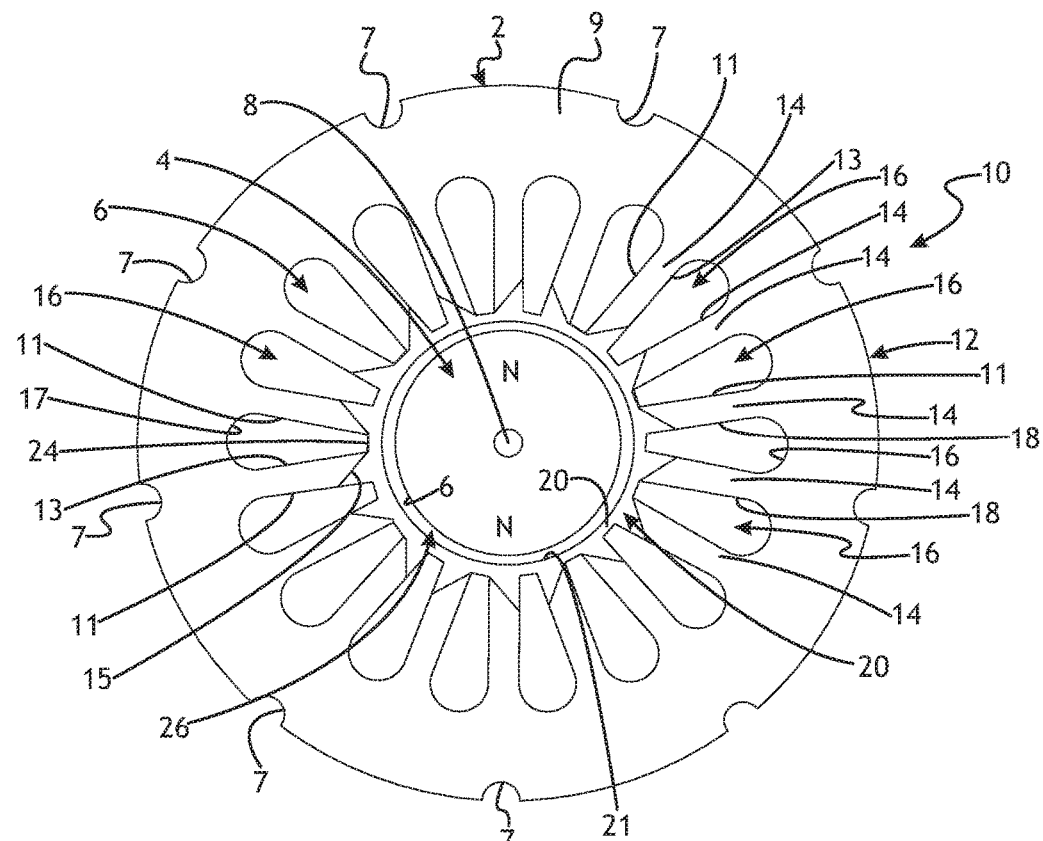
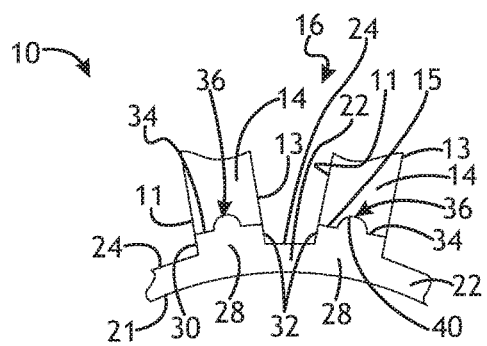
Fig.1
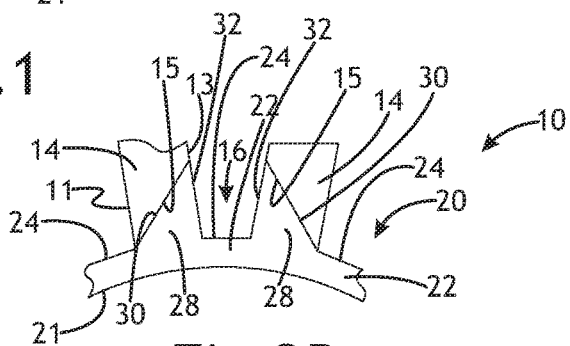
Fig.2B
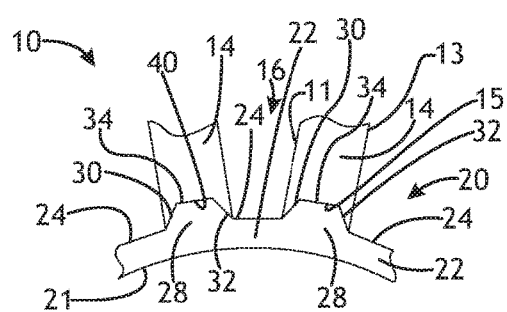
Fig.2A
Fig.2C
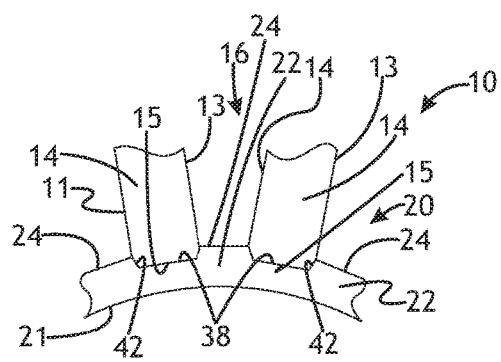
Fig.2D

STATOR CORE AND STATOR SLOT CLOSER

TECHNICAL FIELD

The field to which the disclosure generally relates to includes stator assemblies, electric machines, and products using the same.

BACKGROUND

Electric machines may include a stator assembly and a rotor assembly.

SUMMARY OF ILLUSTRATIVE VARIATIONS

A product comprising a stator core having a stator base portion and a plurality of stator teeth extending from the stator base portion in a radially inward direction from the stator base portion, wherein adjacent stator teeth define, at least in part, a stator slot therebetween, and a stator slot closer having a portion for closing a stator slot.

Other illustrative variations within the scope of the invention will become apparent from the detailed description provided hereinafter. It should be understood that the detailed description and specific examples, while disclosing variations of the invention, are intended for purposes of illustration only and are not intended to limit the scope of the invention.

BRIEF DESCRIPTION OF THE DRAWINGS

Select examples of variations within the scope of the invention will become more fully understood from the detailed description and the accompanying drawings, wherein:

FIG. 1 is a sectional view of a product including a stator core and a stator slot closer according to a number of variations.

FIG. 2A is a sectional view with portions broken away of a stator core and a stator slot closer according to a number of variations.

FIG. 2B is a sectional view with portions broken away of a stator core and a stator slot closer according to a number of variations.

FIG. 2C is a sectional view with portions broken away of a stator core and a stator slot closer according to a number of variations.

FIG. 2D is a sectional view with portions broken away of a stator core and a stator slot closer according to a number of variations.

DETAILED DESCRIPTION OF ILLUSTRATIVE VARIATIONS

The following description of the variations is merely illustrative in nature and is in no way intended to limit the scope of the invention, its application, or uses.

Figure 5:
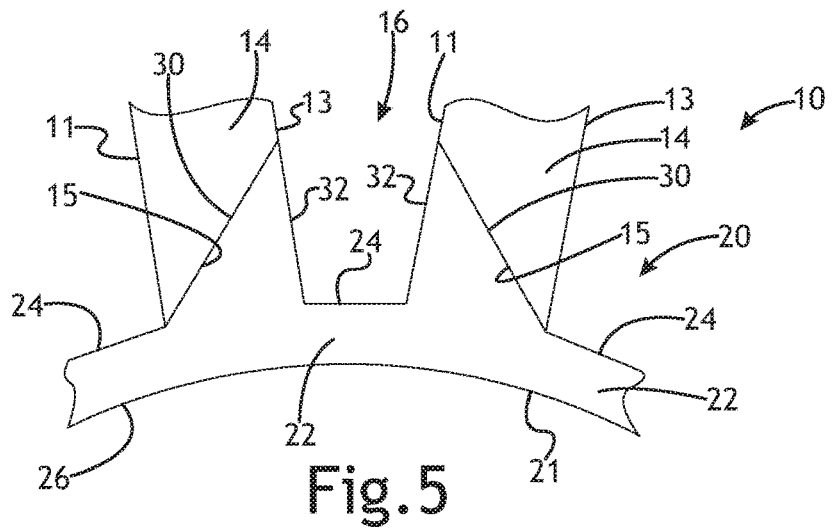
FIG. 5 is a sectional view with portions broken away of a stator core and a stator slot closer according to a number of variations.

FIGS. 1, 2B, and 5 illustrate a number of variations, which may include a product 10 including a stator core 12. In a number of variations, the stator core 12 may be a single, unitary piece that does not include two or more separate pieces joined together. However, the stator core 12 may include elements, or metallurgical compositions or components, which are cast or sintered together. The stator core 12 may include a stator base portion 9. In a number of variations, the stator base portion 9 may be generally annular in shape and may include a plurality of notches 7 formed in an outer periphery surface 2. A plurality of stator teeth 14 may extend from the stator base portion 9 in a radially inward direction. The plurality of stator teeth 14 includes at least a first tooth and a second tooth. Each one (each tooth) of the stator teeth 14 may include a first side surface 11 and an opposite second side surface 13. In a number of variations, each one of the stator teeth 14 may include an end surface 15. Adjacent stator teeth 14 may define, at least in part, a stator slot 16 therebetween. The stator slot 16 may be defined, at least in part, by the first side surface 11 of a first stator tooth 14 and the second side surface 13 of another adjacent stator tooth 14. As such, the stator core 12 includes a stator surface 18 defining a stator slot 16. In a number of variations, the end surface 15 of each of the stator teeth 14, may extend from the first side surface 11 to the second side surface 13. In a number of variations, at least one of the end surfaces 15 may extend at an acute angle, or an obtuse angle, from the first side surface 11. In a number of variations, at least one of the end surfaces 15 may extend at a 90 degree angle from the first side surface 11. In a number of variations, at least one of the end surfaces 15 may be flat or have an arc shaped surface extending from the first side surface 11 to the second side surface 13. At least one of the end surfaces 15 may have a variety of other shapes.

In a number of variations, a stator slot closer 20 may be provided. The stator slot closer 20 may include a base portion 22 having an inner surface 21. In a number of variations, the inner surface 21 may have a constant radius. In a number of variations, the base portion 22 may include a plurality of outer surface segments 24. In a number of variations, the plurality of outer surface segments 24 may have an arch shape. In a number of variations, the plurality of outer surface segments 24 may each have the same radius. In a number of variations, each one of the plurality of outer surface segments 24 may be substantially flat or have a variety of other shapes. In a number of variations, at least some of the outer surface segments 24 may be substantially flat. According to a number of variations, the stator slot closer 22 may be constructed and arranged so that there is an outer surface segment 24 to close an associated stator slot 16. In a number of variations, there may be an equal number of outer surface segments 24 to close a stator slot 16 as the number of stator slots 16 formed in the stator core 12. In a number of variations, the stator slot closer 20 may include a plurality of projections 28 extending from the base portion 22. In a number of variations, each projection 28 may include a first side surface 30 and an opposite side surface 32. In a number of variations, each projection 28 may also include an end surface 34. In a number of variations, the first side surface 30 and/or the end surface 34 may be constructed and arranged to engage the end surface 15 of a stator tooth 14. In a number of variations, the stator slot closers may be a single piece and may be constructed and arranged to close all of the slots 16 of the stator core 12.

In a number of variations, a rotor assembly 4 may be provided and may include a number of magnets constructed and arranged to create a north pole and a south pole in the rotor assembly. A shaft 8 may extend through the rotor assembly 4. The rotor assembly 4 may have an outer surface 6 spaced from the inner surface 21 of the stator slot closer 10 to provide a gap 26 therebetween.

Referring now to FIG. 2A, in a number of variations, the end surface 34 of the projection 28 may include a locking feature 36. In a number of variations, a pocket 40 may be provided in the end surface 15 of a stator tooth 14 to receive the locking feature 36. In a number of variations, the second side surface 32 of adjacent projections 28 and the outer surface segment 24 define a portion of the stator slot 16.

FIG. 2B is an enlarged view of FIG. 1 with portions broken away.

Referring now to FIG. 2C, in a number of variations, the projection 28 may have an end surface 34 which is substantially flat or convex, and the first side surface 30 and second side surface 32 may be tapered inward so that the entire projection 28 is received in a pocket 40 formed in the end surface 15 of each tooth 14.

Referring now to FIG. 2D, in a number of variations, the base portion 22 of the stator slot closer 20 may have a pocket 38 formed in the outer surface thereof to receive a portion of a stator tooth 14. In a number of variations, at least one of the first side surface 11 or second side surface 13 of the stator tooth 14 may include a tapered portion 42, which may also be received in the pocket 38.

Figure 3:
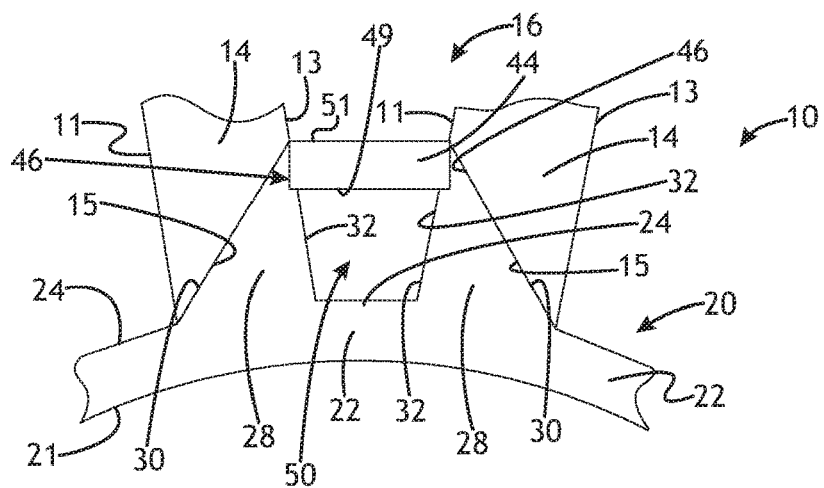
FIG. 3 is a sectional view with portions broken away of a stator core and a stator slot closer defining, at least in part, a cooling channel according to a number of variations.

Referring now to FIG. 3, in a number of variations, a bridge 44 may be provided connecting adjacent projections 28 extending from the base portion 22 of the stator slot closer 20. In a number of variations, each projection 28 may include a notch or pocket 46 for therein to receive a portion of the bridge 44.

In a number of variations, the bridge 44 may be made of a ferromagnetic material. The projections 28 extending from the base portion 22 of the stator slot closer 20 may be made from a ferromagnetic material. The stator core 22 including the stator base portion 9 and the plurality of stator teeth 44 may be made from a ferromagnetic material. The base portion 22 of the stator closer 20 may be made from a ferromagnetic material, or a non-ferromagnetic material, or a mixture of both, according to design requirements. The bridge 44 and the stator closer 20 may be made by a variety of methods including, but not limited to, a powder metal sintering process using SMC, or an additive manufacturing process such as selective laser sintering, or using a sputtering process, for example as described in US Patent Publication No. 2013/0292081. The stator core 12 may be made from a plurality of stacked laminations of relatively thin ferromagnetic material. The ferromagnetic material may be mild steel, or Austenitic steel or other suitable ferromagnetic material. It is anticipated that the bonding between the feral magnetic and non-ferromagnetic regions of the stator slot closer 20 and the bridge 44 will be best if similar based materials are used, for example, both components of iron compounds. However, many other material combinations may be possible. The optimal material combination may be chosen to be suited to the additive manufacturing process and meeting the component requirements, such as mass.

In a number of variations, the inner stator segment may be made as one piece with coolant manifolds at each end of the machine. The manifolds distribute the flow from the coolant supply channel or pipe to/from all the coolant channels running through the machine and the stator slots. In order to make coolant manifolds as 1-piece with the stator inner part, the joint between the stator inner part and the stator outer part needs to be a diameter which is larger than the outside diameter of the coolant manifolds. The addition of coolant manifolds to the stator inner parts means that the cross-section is no longer uniform along the length of the part. This may add some complexity to the sintering/molding process if the part is made of SMC.

Figure 4:
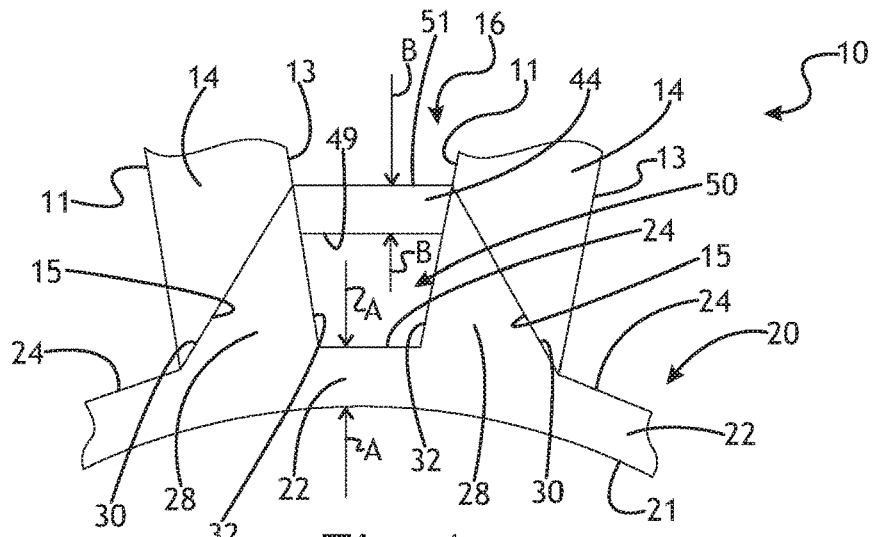
FIG. 4 is a sectional view with portions broken away of a stator core and a stator slot closer defining, at least in part, a cooling channel according to a number of variations.

The thickness of the bridge 44 as measured from surface 51 to surface 49 and as shown by arrows B-B in FIG. 4, should be controlled to prevent cooling fluid leakage. Similarly, the thickness of the base portion 22 of the stator slot closer 20 as measured from surface 24 to surface 26 and as shown by arrows A-A in FIG. 4 must be controlled to prevent leakage.

FIG. 5 is an enlarged view of FIG. 2B and of FIG. 1 with portions broken away.

Figure 6A:
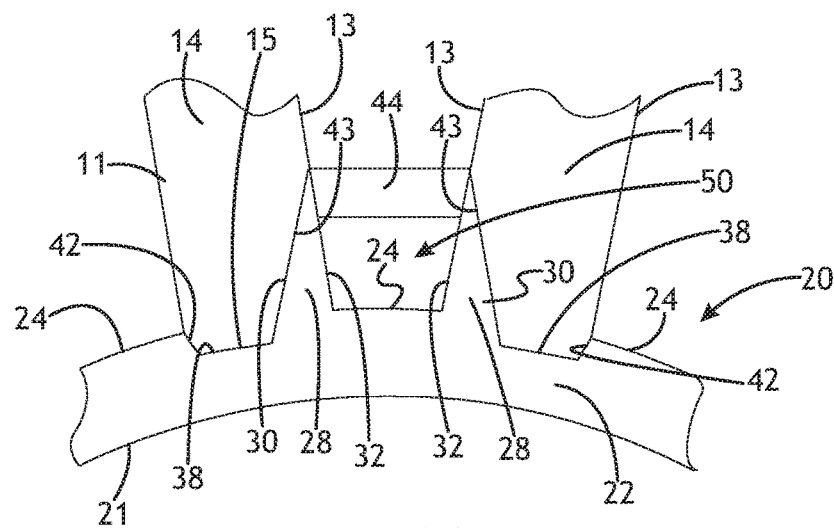
FIG. 6A is a sectional view with portions broken away of a stator core and a stator slot closer defining, at least in part, a cooling channel according to a number of variations.
Figure 6B:
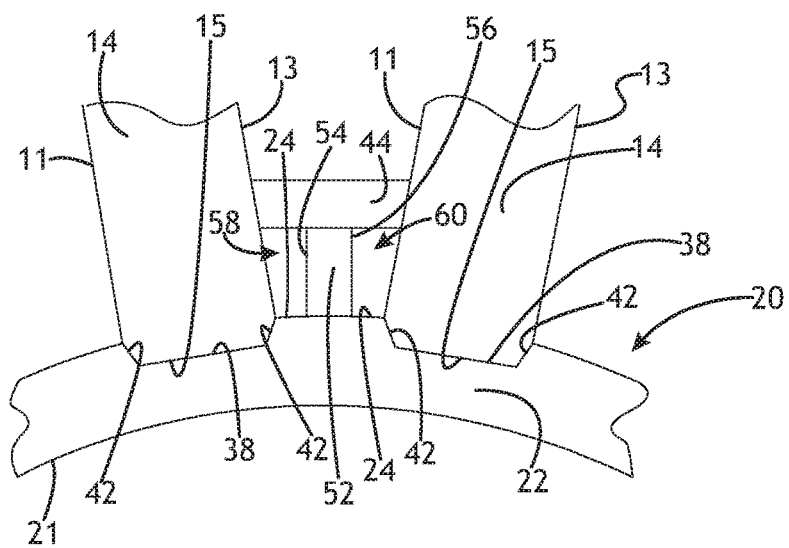
FIG. 6B is a sectional view of a stator core and a stator slot closer defining, at least in part, at least one cooling channel therethrough according to a number of variations.

Referring now to FIG. 6A, in a number of variations, a pocket 38 may be formed in the base portion 22 to receive a portion of one of the stator teeth 14. In a number of variations, the first side surface 30 of the projection 80 may engage a inwardly tapered section 43 of the second side surface 13 of the stator tooth 14. Referring now to FIG. 6B, in a number of variations, a pocket 38 may be provided to receive a portion of a tooth 14 of the stator core 12. In a number of variations, each of the first side surface 11 and the second side surface 13 may include a inwardly tapered portion 42. In a number of variations, a finger 52 may extend from an outer surface segment 24 to engage the bridge 44. A first side surface 54 of the finger 52 may refine, in part, a first cooling channel 58. A second side surface 56 of the finger 52 may define, in part, a second cooling channel 56.

The following description of variants is only illustrative of components, elements, acts, product and methods considered to be within the scope of the invention and are not in any way intended to limit such scope by what is specifically disclosed or not expressly set forth. The components, elements, acts, product and methods as described herein may be combined and rearranged other than as expressly described herein and still are considered to be within the scope of the invention.

Variation 1 may include a product comprising a stator core having a stator base portion and a plurality of stator teeth extending from the stator base portion in a radially inward direction from the stator base portion, wherein adjacent stator teeth define, at least in part, a stator slot therebetween, and a stator slot closer having a portion for closing an associated stator slot, and wherein the stator base portion and the plurality of stator teeth extending from the stator base portion in a radially inward direction from the stator base portion are a single, unitary piece that does not include two or more separate pieces joined together.

Variation 2 may include a product as set forth in Variation 1 wherein each of the plurality of stator teeth includes a first side surface, a second side surface, and an end surface extending between the first side surface and the second side surface.

Variation 3 may include a product as set forth in any of Variations 1-2 wherein the slot closer includes a plurality of projections including at least a first projection and a second projection, wherein the plurality of stator teeth includes at least a first tooth and a second tooth, and wherein the first projection engages the first tooth and the second projection engages the second tooth.

Variation 4 may include a product as set forth in any of Variations 1-3 wherein the slot closer includes a plurality of pockets formed in an outer surface thereof including at least a first pocket and a second pocket, wherein the plurality of stator teeth includes at least a first tooth and a second tooth, and wherein portion of the first tooth is received in the first pocket of the stator slot closer and a portion of the second tooth is received in the second pocket of the stator slot closer.

Variation 5 may include a product as set forth in any of Variations 1-4 wherein the slot closer includes a base portion having a plurality of outer surface segments, and wherein at least two of the outer surface segments having the same radius.

Variation 6 may include a product as set forth in any of Variations 1-5 wherein the slot closer includes base portion having a plurality of outer surface segments, and wherein at least one of the outer surface segments is flat.

Variation 7 may include a product as set forth in any of Variations 1-6 wherein the slot closer includes base portion having an inner surface having a constant radius.

Variation 8 may include a product as set forth in any of Variations 1-7 wherein each of the plurality of stator teeth includes a first side surface, a second side surface, and an end surface extending between the first side surface and the second side surface, wherein the slot closer includes a plurality of projections including at least a first projection and a second projection, wherein the plurality of stator teeth includes at least a first tooth and a second tooth, and wherein the first projection engages the end surface of the first tooth and the second projection engages the end surface of the second tooth.

Variation 9 may include a product as set forth in any of Variations 1-8 wherein the end surface of the first tooth extends at an obtuse angle or acute angle from the first side surface of the first tooth, and the end surface of the second tooth extends at an obtuse angle or acute angle from the first side surface of the second tooth.

Variation 10 may include a product as set forth in any of Variations 1-9 wherein each of the first projection and the second projection includes a first side surface and a second side surface, wherein the first side surface of the first projection extends at an obtuse or acute angle from the second side surface of the first projection, wherein the first side surface of the second projection extends at an obtuse or acute angle from the second side surface of the second projection.

Variation 11 may include a product as set forth in any of Variations 10 further comprising a bridge extending between the first projection and the second projection so that a cooling channel is provided and defined, at least in part, by surfaces of the bridge, first projection and second projection.

Variation 12 may include a product as set forth in any of Variations 1-11 wherein the bridge comprises a ferromagnetic material.

Variation 13 may include a product as set forth in any of Variations 1-12 wherein each of the plurality of projections of the slot closer comprises a ferromagnetic material.

Variation 14 may include a product as set forth in any of Variations 1-13 wherein the base portion of the stator core and the stator teeth comprises a ferromagnetic material.

Variation 15 may include a product as set forth in any of Variations 1-14 wherein the base portion of the slot closer comprises a non-ferromagnetic material, a ferromagnetic material, or a mixture of non-ferromagnetic material and ferromagnetic material.

The above description of select variations within the scope of the invention is merely illustrative in nature and, thus, variations or variants thereof are not to be regarded as a departure from the spirit and scope of the invention.

What is claimed is:

1. A product comprising a stator core having a stator base portion and a plurality of stator teeth extending from the stator base portion in a radially inward direction from the stator base portion, wherein adjacent stator teeth define, at least in part, a stator slot therebetween, and a stator slot closer having a portion for closing an, associated stator slot, and wherein the stator base portion and the plurality of stator teeth extending from the stator base portion in a radially inward direction from the stator base portion are a single, unitary piece that does not include two or more separate pieces joined together, wherein each of the plurality of stator teeth includes a first side surface, a second side surface, and an end surface extending between the first side surface and the second side surface, wherein the slot closer incudes a plurality of projections including at least a first projection and a second projection adjacent to the first projection, wherein the plurality of stator teeth includes at least a first tooth and a second tooth adjacent to the first tooth, and wherein the first projection engages the end surface of the first tooth and the second projection engages the end surface of the second tooth, wherein the end surface of the first tooth extends at an obtuse angle or acute angle from the first side surface of the first tooth, and the end surface of the second tooth extends at an obtuse angle or acute angle from the first side surface of the second tooth, wherein each of the first projection and the second projection includes a first side surface and a second side surface, wherein the first side surface of the first projection extends at an obtuse or acute angle from the second side surface of the first projection, wherein the first side surface of the second projection extends at an obtuse or acute angle from the second side surface of the second projection, and further comprising a bridge extending between the first projection and the second projection so that a cooling channel is provided and defined, at least in part by, surfaces of the bridge, first projection and second projection, and wherein the bridge is connected to the first projection and the second projection.

2. A product as set forth in claim 1 wherein the slot closer includes a base portion having a plurality of outer surface segments, and wherein at least two of the outer surface segments having the same radius.

3. A product as set forth in claim 1 wherein the slot closer includes base portion having an inner surface having a constant radius.

4. A product as set forth in claim 1 wherein the bridge comprises a ferromagnetic material.

5. A product as set forth in claim 1 wherein each of the plurality of projections of the slot closer comprises a ferromagnetic material.

6. A product as set forth in claim 1 wherein the base portion of the stator core and the stator teeth comprises a ferromagnetic material.

7. A product as set forth in claim 1 wherein the base portion of the slot closer comprises a non-ferromagnetic material, a ferromagnetic material, or a mixture of non-ferromagnetic material and ferromagnetic material.

* * * * *